June 9, 1964  C. H. NEHLS  3,136,148
LOCKING CLOSURE

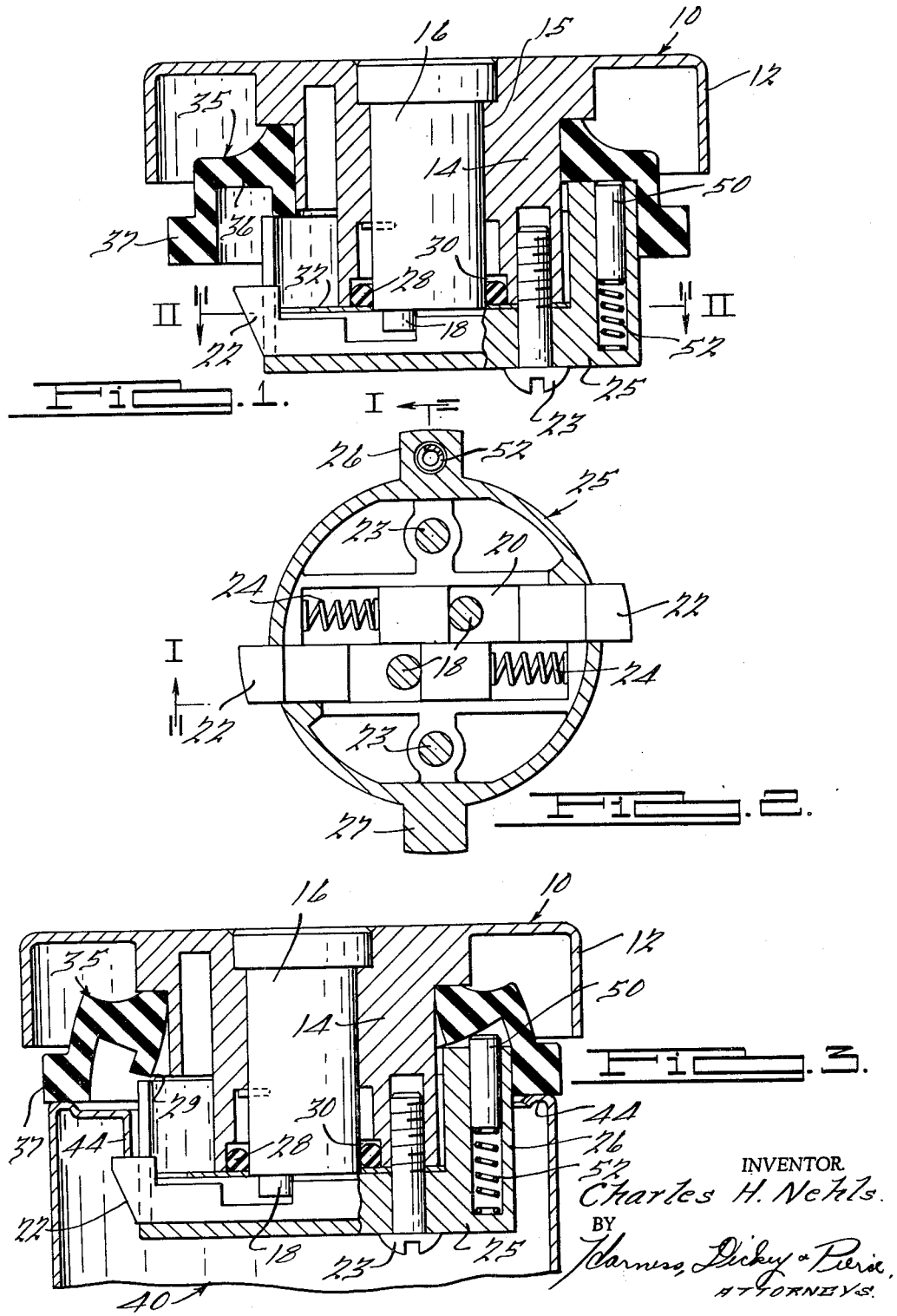

Filed April 26, 1963  2 Sheets-Sheet 2

INVENTOR.
Charles H. Nehls.
BY
Harness, Dickey & Pierce.
ATTORNEYS.

United States Patent Office 3,136,148
Patented June 9, 1964

3,136,148
LOCKING CLOSURE
Charles H. Nehls, 495 Shoreham,
Grosse Pointe Woods 36, Mich.
Filed Apr. 26, 1963, Ser. No. 275,838
3 Claims. (Cl. 70—169)

The present invention relates to lockable covers or closure devices, and particularly to an improved lockable cap for motor vehicle fuel tanks.

Although the American motor vehicle manufacturers utilize standardized parts to as great a degree as is practicable, including fuel tank caps of interchangeable design, complete standardization of the filler necks of motor vehicle fuel tanks is not desirable since some fuel tanks are vented through the cap, while for functional reasons others must be sealed at the cap and are provided with venting means at a different location. Because of these considerations, a very substantial difference exists between the two major types of filler necks utilized by the manufacturers at the present time, although the diameters of the filler necks of the two most common types are uniform. This differentiation, which is made in order to protect the public against the substitution of unsuitable caps, involves the use of different depths of inturned flanges, making it impossible to interchange and so wrongly apply the two basic types of (vented and non-vented) conventional nonlockable caps. Such conventional non-locking caps are of the bayonet-fastening type, adapted to be secured to and released from the filler neck by simple partial rotation of the cap. On the other hand, preferred forms of locking caps are not applied to the tank by rotation, but simply by pushing the cap straight onto the filler neck. A plug-like portion of the cap then enters the neck and the cap latches itself in place by means of snap-type latch bolts, which can only thereafter be released by means of a key-operable lock, mounted in the cap. The arrangement is such that an inherent spring resistance opposes the full application of the cap to the latched position, and this biasing effect tends to push the cap up, to a position where the bolts cannot accidentally relatch, as soon as the bolts are retracted by the key.

The principal object of the present invention is to provide an improved lockable cap construction of the indicated character which is adapted to be used upon both types of conventional filler necks, that is, those having deep inturned flanges and those with shallow flanges, and which functions equally well with flanges of differing depths.

A further object is to provide such an improved locking cap having unique automatically extensible blocking means which effectively prevents rotation of the cap with respect to the filler neck regardless of the depth of the filler neck flange, thereby preventing portions of the cap structure from becoming hooked or jammed under the filler neck flange. This features eliminates a serious difficulty which has heretofore been encountered with caps intended for use upon filler necks of the two differing constructions referred to.

Other objects and advantages will become apparent upon consideration of the present disclosure in its entirety.

In the drawing:

FIGURE 1 is a sectional view of my improved lockable closure, taken upon two generally radial lines, substantially as indicated by the line and arrows I—I of FIGURE 2;

FIG. 2 is a transverse sectional plan view taken substantially on the plane of the line II—II of FIGURE 1;

FIG. 5 is a fragmentary perspective view of a filler neck of the shallow flange type showing the anti-hooking-blocking device and the manner in which it coacts with the filler neck.

Figure 3:
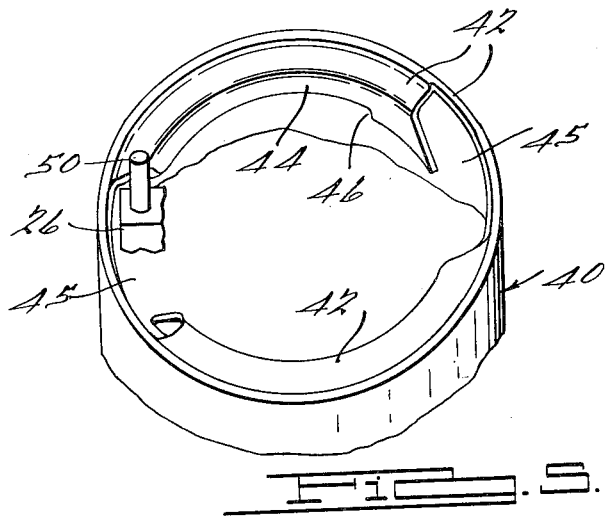
FIG. 3 is a sectional view similar to FIGURE 1 but showing the cap locked in position upon a filler neck having a shallow flange.

Referring now to the drawing, my improved cap construction is, in most of its aspects, of a well known design. It comprises a die-cast body generally designated 10 having a skirted circular upper hand grip portion 12 and an integral axial body portion 14 adapted to project into the filler neck. An axially disposed lock cylinder 15 is formed in the body in which a lock plug 16 is rotatably mounted in a conventional manner with its key-receiving opening (not shown) accessible from the top of the cap. Eccentric lugs 18 projecting downwardly from the lock plug 16 extend into slots 20 formed in latch bolts 22, which are oppositely and outwardy slidably projectible and retractable. The latch bolts are biased outwardly by spring 24 and are retractable by the lug portions 18 when the lock plug is turned. The bolts are slidably supported in a cupped retainer 25 secured to the body section 14 by screws 23. An O-ring seal 28 is provided around the lower end of the lock plug 16 and is retained in a groove 30 in the body by a plate 32 which also overlies the bolts and the springs between the body portion 14 and the cupped retainer 25.

Projecting diametrically outwardly from the retainer cup 25 are a pair of axially extending integral ribs 26, 27.

The retainer cup 25 also secures in position a combined gasketing and spring member 35 formed of resilient synthetic rubber, or the like. Gasket-spring member 35 snugly encircles and is substantially sealed against the periphery of the body portion 14. The inner wall of gasket-spring 35 which engages body portion 14 is partly cut away for clearance with respect to ribs 26, 27, which extend upwardly somewhat higher than the remainder of the top of cup 25. The gasket-spring member is provided near its upper end with a portion 36 which when this member is relaxed, as shown in FIGURE 1, is generally flat and extends radially outwardly. From portion 36 a generally cylindrical peripheral portion extends downwardly for engagement with the upper edge of the filler neck, the lower edge of such downwardly extending portion being radially thickened as indicated at 37.

As previously indicated, locking caps of the type here involved are intended to be used with a filler neck which is designed to accept a simple non-locking cap (not shown) having bayonet prongs which are adapted to be rotatably tightened into under-engaged relationship with respect to inclined bayonet-type holding parts on the filler neck. The general construction of the cap-receiving part of such a filler neck is shown in perspective in FIGURE 5. In that view the filler neck is generally designated 40, and as there shown, the upper end of the neck is turned inwardly to provide a generally horizontal flat top portion 42 against which the bottom part 37 of the gasket-spring sealingly engages. The flanges 42 are partially but not entirely cut away at two diametrically spaced positions, such interruptions defining diametrically enlarged areas 45 adapted to receive the bayonet locking prongs of a conventional cap, the inner edges of the inturned top portions 42 except in areas 45 being bent downwardly to define generally cylindrical down-turned walls 44. Walls 44 are inclined, in an axial direction, to define bayonet-type holding flanges of graduatedly increasing depth in a clockwise direction away from each of the openings 45, as is well known. As is well known, application of a conventional non-locking cap involves inserting the prongs in the openings 45 and rotating the cap until the prongs are tightened against the bottoms of the portions 44, the limit of the possible clockwise rotation being defined by abutments 46.

Figure 4:
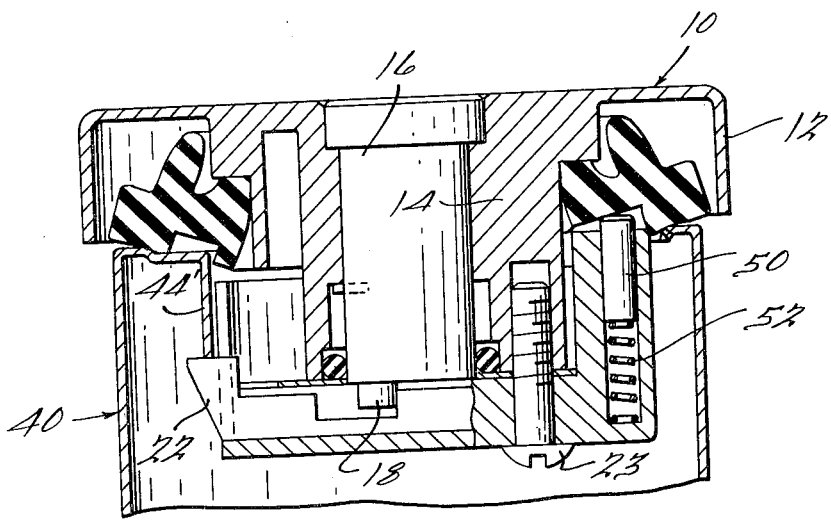
FIG. 4 is a similar sectional view showing the cap applied to a filler neck having a deep flange.

FIGURE 5 shows the down-turned flange portions 44 as relatively short or shallow in an axial direction, the showing of FIGURE 5 corresponding to that of FIGURE 3 in this regard. FIGURE 4 illustrates the other conventional type of filler neck, which is similar, but in which the flange portions 44' are longer or deeper in an axial direction. The range of axial travel permitted by the gasket spring and the design of the parts permits use of the cap with both types of filler necks.

The rib portions 26, 27 of my improved locking cap prevent its application to the filler neck except when the ribs are aligned with the enlargements 45. The ribs 26, 27 may then enter enlargements 45, and are provided in order to key the cap against rotation with respect to the filler neck, and to prevent freeing the latch bolts by turning the cap. The cap is locked in place by pushing it downwardly against the resistance of gasket-spring 35 until the latch bolts 22 snap under the flanges 44. It will be seen that if the cap as thus far described were pushed downwardly far enough to cause the upper ends of the ribs 26, 27 to lie below the shallow ends of the inclined flanges 44, which is not difficult of accomplishment with filler necks of the shallow-flanged type, the cap would be rotatable in a clockwise direction to thereby bring the ribs 26, 27 under the flanges 44, which would hold the cap in position and prevent its removal from the filler neck, even with the latch bolts retracted. In order to remove the cap it would then be necessary both to rotate the cap counterclockwise and simultaneously to turn the lock with the key to retract the latch bolts.

Due to the necessary resiliency of the gasket-spring member 35, the clearance which must be provided for it within the belled flange 12 of the cap, and the desirability of preventing unwanted distortion of the gasket, it is not feasible to extend ribs 26, 27 upwardly far enough to block unwanted rotation of the cap under all conditions, particularly when the cap is applied to necks of the shallow-flanged type. Under such conditions it is possible, if enough downward force is applied to the cap, to push the ribs 26, 27 downwardly below the shallow entry ends of the flanges 44, as indicated previously. In order to prevent rotation of the cap under such conditions, I provide in one of the ribs 26 a pin 50 which is yieldably biased upwardly from the upper end of rib 26 under the influence of a compression spring 52 trapped beneath the pin. The spring 52 has relatively light force and the pin is normally held down against the lifting force of the spring as shown in FIGURE 1, by the lower face of the flat portion 36 of gasket-spring 35. When the cap is pushed downwardly on the filler neck, however, and the gasket-spring element is distorted upwardly in the manner generally illustrated in FIGURES 3 and 4, the upward movement of the lower face of the gasket-spring member, away from the top of the rib 26, permits the pin 50 to rise under the influence of spring 52. Pin 50 thus forms in effect an upward continuation of rib 26, and under such conditions the pin is extended upwardly as far as the cap is pushed downwardly. Thus, as illustrated somewhat diagrammatically in FIGURE 5, if the ribs are pushed downwardly below the flanges and cut out areas 45, the pin 50 always projects upwardly into the cut out area 45 and lies beside the leading end of the flange portions 42, 44, thereby blocking rotation of the cap with respect to the filler neck. Thus ribs 26 and 27 cannot be rotated into under-engaged holding relation beneath the inturned flanges of the filler neck, and it is rendered impossible to turn the cap to a position such that it cannot be removed in the intended manner by direct upward movement as soon as the lock bolts are retracted by the key.

While it will be apparent that the preferred embodiment of the invention hereinabove described is well adapted to fulfill the objects and advantages first above stated, it will be apparent that the invention is susceptible to variation, modification and change without departing from the fair scope of the subjoined claims.

I claim:

1. A lockable closure for use with a filler neck or the like having an opening bounded by a downwardly directed interrupted flange of the bayonet-fastening type, comprising a body including a portion adapted to enter such an opening and snap latch-type lock bolts projectible laterally from a lower portion of such portion of the body, a rib projecting radially from such body portion at a position angularly spaced from the latch bolts for coaction with the interrupted portions of such a filler neck flange or the like to hold the cap against unwanted rotation, a pin slidable in and adapted to project upwardly from the rib, and spring means yieldably urging the pin in an upward direction whereby the pin may form an upward extension of such rib.

2. Means as defined in claim 1 including a gasket-spring element normally overlying the rib and pin.

3. Means as defined in claim 1 including a gasket-spring element normally overlying the rib and pin and normally opposing upward projection of said pin except when said gasket-spring element is distorted in an upward direction.

References Cited in the file of this patent

UNITED STATES PATENTS

| | | |
|---|---|---|
| 1,775,318 | Morgan | Sept. 9, 1930 |
| 1,878,436 | Burroughs | Sept. 20, 1932 |
| 2,406,464 | Katz | Aug. 27, 1946 |
| 2,880,903 | Nehls | Apr. 7, 1959 |